P. Ware. Jr.,

Rubber.

No. 42,423. Patented Apr. 19, 1864.

WITNESSES.

UNITED STATES PATENT OFFICE.

PRESTON WARE, JR., OF BOSTON, MASSACHUSETTS.

IMPROVED COMPOSITION SOLES AND MOLDS FOR THE SAME.

Specification forming part of Letters Patent No. 42,423, dated April 19, 1864.

*To all whom it may concern:*

Be it known that I, PRESTON WARE, Jr., of Boston, in the county of Suffolk and State of Massachusetts, have invented certain new and useful Improvements in the Manufacture of Vulcanized-India Rubber Soles and Method of Producing the Same; and I hereby declare that the following is a full, clear, and exact description of the same, reference being had to the accompanying drawings, in which—

Figure 1:
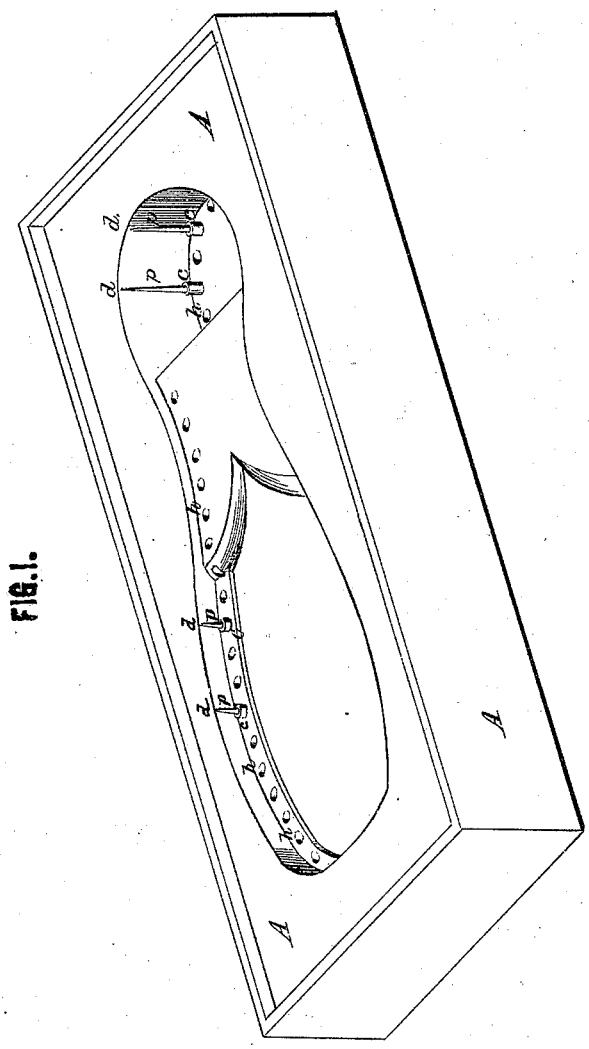
Figure 2:
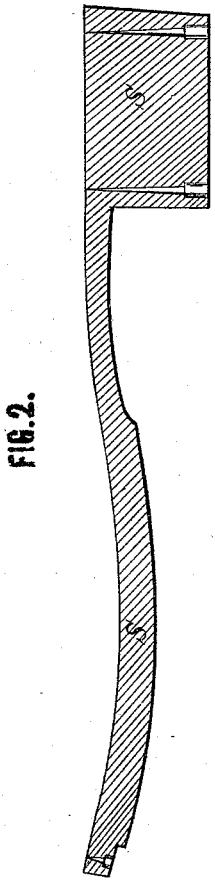

Figure 1 represents in perspective view the interior of a mold for making composition soles or for vulcanizing rubber soles made in accordance with my invention; and Fig. 2 is a sectional elevation of a sole produced in the mold before referred to.

Rubber soles or composition soles were heretofore made with or without the pegs or rivets, whereby they are attached to the uppers of boots and shoes. For those without the pegs or other mechanical appliances of attachment it was found necessary to provide apertures or holes through which the nails, pegs, threads, or other means of attachment were introduced, and these holes it was also found necessary to make previous to vulcanization if the sole be made of rubber or of any other vulcanizable gum.

This invention relates to the latter class of soles; and it consists in the peculiar shape of the holes or apertures, so that the nails or pegs may be buried beneath the surface of the sole, and in the manner of producing the same. The molds for the manufacture of these kinds of soles have been heretofore made with small pins placed around inside, near the edge, for the purpose of leaving a hole in the sole for the nail or rivet after it is vulcanized, such pins being fastened in by soft metal introduced in a liquid state from the bottom of the mold.

The composition sole in the process of vulcanization adheres very tenaciously to these pins, and in forcing out the sole after it is vulcanized these pins are liable to be disturbed, and the mold must be repaired before it can be used again; and, further, these pins being numerous and the adhesion so strong that it is difficult to extract the sole from the mold without tearing or injuring it; and in attaching s les thus manufactured to the boot or shoe long nails or rivets are required, which in a thick sole produces too much leverage on the nail or rivet, making them liable to break.

Objections are also made to soles manufactured in this manner in consequence of their leaving the heads of the rivets or nails on the surface of the boots and shoes after they are completed.

Now, the object of my invention is to obviate the above-recited difficulties; and, to enable others to make and use the invention, I shall now proceed to describe the manner in which the same is or may be carried into effect.

The mold I use is made of cast-iron or other suitable material, and consists of a lower shell recessed in conformity with the outside form or shape of the sole to be molded, and of an upper shell or covering whereby the mold is closed. The lower shell or mold proper, (marked in the drawings A and represented in isometrical perspective view in Fig. 1,) is provided with a series of holes, $h$, arranged in a line parallel with the edge of the sole. These holes are drilled in the bottom part of the mold and pass through the whole of its thickness. Into these holes are inserted pins $p$ of a peculiar form, as shown in Fig. 1. They are composed of a head of a diameter larger than the hole in the mold, so that when inserted in the mold the heads of the pins will remain on the outside, thus determining the depth to which the pins are to penetrate the interior of the mold, and affording the means of seizing for the purpose of withdrawing the pins from the mold. The cylindrical portion $c$ is longer than the thickness of the mold, the length being determined by the thickness of the sole and the countersink or the extent to which the nails or rivets (whereby the sole is to be attached to the uppers) are to be buried beneath the surface of the sole. The remainder of the pin $d$ is made tapering or conical in the usual manner, and this part of the pin is of a length equal to, or nearly so, the depth of the sole. The mold and the pins are used in the following manner: The rubber composition, or any other vulcanizable compound, is placed in the mold, and the cover or top is applied to it and securely fastened. I then turn the mold upside down and drive the pins one by one into the holes in the bottom of the mold. By thus proceeding I form holes in the plastic composition of rubber which are the exact counterpart of the pins before described. The mold, with the pins, is then placed in the heater and the compound is vulcanized. After the vulcanization is effected I extract the pins one by one, and then remove the sole from the mold without difficulty. A sole made in the manner described will contain the holes for the insertion of the nails, rivets, or pegs, as shown in Fig. 2. The holes, it will be seen, are in part cylindrical and in part conical, the cylindrical part being toward the bottom of the sole and the conical part toward the top thereof. These soles are nailed to boots and shoes by means of a tool corresponding in size to the head of the nail, which is driven down below the surface of the sole. The space between the head of the nail and the surface of the sole may be filled up with some composition cement, and in this way I do away with the objection against nailed soles, and, moreover, protect the nails against corrosion.

Having now described my invention, and the manner in which the same may be made and used, I shall state my claims as follows:

1. A vulcanized-rubber sole, or sole made of any suitable composition, whether vulcanized or not, in which the holes designed to contain the nails or rivets whereby it is fastened to the boot or shoe are countersunk so that the heads of the nails, rivets, &c., may be beneath the surface of the sole, substantially in the manner and for the purposes set forth.

2. Forming such holes by means of pins of the form and inserted in the molds in the manner described.

3. The method of molding rubber or composition soles provided with holes by first filling the molds with the compound or composition in its plastic state, and by subsequently forming therein the holes by driving the pins or cores into the molded mass, as described.

In testimony whereof I have signed my name to this specification before two subscribing witnesses.

P. WARE, Jr.

Witnesses:
THOMAS F. NUTTER,
WM. D. A. WHITMAN.